3,177,260
NEW ORGANIC COMPOUND AND PROCESS FOR MAKING THE SAME

Jan Muray, Widnes, and James Raventos, Macclesfield, England, assignors to Imperial Chemical Industries Limited, London, England, a corporation of Great Britain
No Drawing. Filed May 14, 1962, Ser. No. 194,726
Claims priority, application Great Britain, May 26, 1961, 19,086/61
1 Claim. (Cl. 260—653)

This invention provides a new halohydrocarbon and a process for making the same.

The novel compound is systematically named 3-bromo-3-chloro-1:1:2:2-tetrafluoropropane and is represented by the formula $CH_2.CF_2.CHBrCl$. It is useful as a non-inflammable inhalation anaesthetic for administration to man or to animals.

The margin of safety of 3-bromo-3-chloro-1:1:2:2-tetrafluoropropane, when used as an inhalation anaesthetic in experimental animals, is high. In pathogen-free mice, the LC50/AC50 ratio (LC50 being the minimum concentration, by volume, of vapour needed to kill 50% of test mice in 30 minutes and AC50 being the minimum concentration by volume of vapour needed to produce full anaesthesia in 50% of the test mice in 30 minutes) is 1.0:0.19, i.e., 5.3. Under the same conditions, the LC50/AC50 ratio of ether is 10.1:3.51, i.e., 2.88 that of chloroform is 2.63:0.99, i.e., 2.66 and that of halothane is 3.75:0.8, i.e., 4.69. In preliminary studies in rabbits and in dogs, we have found that 3-bromo-3-chloro-1:1:2:2-tetrafluoropropane gives an exceptionally smooth and rapid induction to full surgical anaesthesia in about 5 minutes by inhalation of the vapour in air at a concentration of 1.0–1.5% by volume and this anaesthesia can be maintained at a concentration of about 0.5–0.7% by volume. At these concentrations and in the experimental animals used, this new compound does not cause cardiac irregularities. In experiments with rabbits full surgical anaesthesia is produced in about 5 minutes by inhalation of the vapour in air at a concentration of 1.07% by volume and this anaesthesia can be maintained at a concentration of 0.5%–0.7% by volume. The lethal concentration in rabbits after inhalation for 1 hour is 3.5% by volume and thus the ratio of lethal concentration to maintenance concentration is between 3.5:0.7 and 3.5:0.5, i.e., between 5.0 and 7.0. At this maintenance concentration of 0.5–0.7% by volume, the respiratory minute volume of the animals is unaffected and there is only a very slight fall in the blood pressure. At the same the electroencephalogram (ECG) indicates no cardiac irregularities.

In experiments with dogs, full surgical anaesthesia is produced in about 5 minutes by inhalation of the vapour in air at a concentration of 1.5% by volume. This concentration is not lethal and the dogs remain anaethetised for a period in excess of 2 hours. Under these conditions, there is only a very slight decrease in the respiratory minute volume and a slight decrease in the blood pressure of the animals. At the same time, the ECG indicates no cardiac irregularities. The minimum concentration that will maintain anaesthesia after induction is about 0.7% by volume and this produces minimum side effects on the respiration and circulation. Recovery of the dogs after 2 hours anaesthesia is rapid and takes place in less than 20 minutes.

A further feature of the invention is the provision of a process for the manufacture of the compound by the halogenation (with bromine or with chlorine) of the corresponding 3-chloro- or 3-bromo-1:1:2:2-tetrafluoropropane.

According to one method the compound is made by heating 3-chloro-1:1:2:2-tetrafluoropropane with bromine.

When carrying out this reaction in the vapour phase temperatures of at least 350° C. are preferred and temperatures in excess of 400° C. are particularly preferred. Temperatures greater than 550° C. are preferably avoided since there is a tendency to the formation of decomposition products even at this latter temperature and this tendency increases further at still higher temperatures.

According to another method the compound is made by heating 3-bromo-1:1:2:2-tetrafluoropropane with chlorine.

When carrying out this reaction in the vapour phase temperatures of at least 325° C. are preferred and temperatures of at least 375° C. are particularly preferred. Temperatures greater than 450° C. are however preferably avoided.

Again the halogenation of the chlorofluoro or bromofluoropropane may be effected in the liquid phase in the presence of U.V. light. For example the chlorination of 3-bromo-1:1:2:2-tetrafluoropropane may be carried out in the liquid phase in the presence of ultraviolet light at a relatively low temperature of about 50–100° C. and more particularly at about 70–80° C. In all the halogenation reactions a molar excess of the chlorofluoro- or bromofluoropropane is preferred.

The organic starting materials to be reacted with bromine or chlorine may be obtained by gently warming 2:2:3:3-tetrafluoropropanol-1 in the presence of an aqueous solution of caustic soda with p-toluene sulphonyl chloride to give 2:2:3:3-tetrafluoropropyl-p-toluene sulphonate and reacting this latter compound with potassium halide (chloride or bromide) in the presence of diethylene glycol.

According to a further feature of the invention we provide inhalant anaethestic compositions comprising 3-bromo-3-chloro-1:1:2:2-tetrafluoropropane in admixture with oxygen in suitable proportions for the production of anaesthesia in man or in animals.

The said compositions may be used in any means according to the known art for the production of anaesthesia in man or in animals for example they may be used in apparatus or machines adapted for the vaporisation of liquid anaesthestics and the admixture thereof with oxygen or with air or other gaseous mixtures containing oxygen in amount capable of supporting respiration. The inhalation anaethestic agent, 3-bromo-3-chloro-1:1:2:2-tetrafluoropropane boils at 99° C. and is conveniently stored in containers normally used for related inhalant anaesthetics of comparable boiling point for example ether, chloroform or halothane.

It will be appreciated that the 3-bromo-3-chloro-1:1:2:2-propane used for anaesthetic purposes should be free from any toxic impurities which may be present according to the particular process used for its manufacture. The inhalant anaesthetic compositions of the invention may, if desired, be admixed with other pharmaceutically-acceptable materials for example stabilisers and the like. As stabilisers there may be used for example a volatile agent such as ethanol which is physiologically tolerable or a non-volatile agent which is not carried over during vaporisation such as thymol.

The inhalant anaesthetic compositions of the invention may likewise contain, if desired, one or more known inhalant anaesthetics for example ether, chloroform, nitrous oxide, ethylene, trichloroethylene, cyclopropane, halothane, divinyl ether, trifluoroethyl vinyl ether and methoxyflurane.

The anaesthetic agent is preferably administered by inhalation in admixture with at least one other constituent comprising oxygen preferably in controlled amounts of a gaseous vehicle. Thus the anaesthetic agent is vapourised and mixed with oxygen, supplied for example either as pure oxygen or as air, to form a gaseous inhalant anaesthetic composition containing a sufficient proportion of the anaesthetic agent to produce the desired depth of anaesthesia and a sufficient proportion of oxygen to maintain adequate respiration. The anaesthetic agent vapour and the oxygen or gaseous mixture containing oxygen may be premixed or they may be mixed during administration to provide the desired proportion of the anaesthetic agent and oxygen in the lungs.

The following examples illustrate but do not limit the invention.

*Example 1*

73.5 g. of a liquid mixture of 3-chloro-1:1:2:2-tetrafluoropropane and bromine were passed per hour into a glass flask heated by means of an oil bath held at 140° C. and the resultant vaporised mixture was swept into a silica reaction tube by means of a stream of nitrogen at the rate of 5 l. per hour. The total amount of the organic compound and bromine passed into the flask was 188 g. and 63 g. respectively, representing a molar ratio of organic compound/bromine of approximately 3:1. 76 cms. of the length of the silica tube was surrounded by an electrical resistance furnace. The temperature of the inner middle portion of the tube as measured from a point 8 cms. from the inlet of the tube to a point 8 cms. from the exit of the tube was approximately 500° C. The mixed product leaving the tube was passed into a flask which was at atmospheric temperature, the flask being surmounted by a water-cooled double surface condenser. Most of the product together with unreacted material condensed in the flask. Any remaining material was condensed in a vessel cooled by means of a mixture of trichloroethylene and solid carbon dioxide.

The condensed material was washed with dilute aqueous caustic soda solution and water and was then dried and distilled. A first fraction distilling off at a temperature of up to 54° C. consisting essentially of unreacted organic starting material was obtained. There was also obtained a yield based on the chlorofluoropropane consumed in the process of 59.5% of a material distilling at 99° C. This material had the following analysis: carbon 15.9%, hydrogen 0.9%, bromine 34.1%, chlorine 15.7%, the remainder being fluorine and was further identified as 3-bromo-3-chloro-1:1:2:2-tetrafluoropropane by mass spectrometry.

*Example 2*

3 - bromo - 1:1:2:2 - tetrafluoropropane (3 molar proportions) and chlorine (1 molar proportion) were passed in the gaseous state through a silica tube heated to 380° C., the "contact time" (i.e., the ratio of the volume of the heated zone to the rate of flow of the gas mixture measured in volumes per second) being 18 seconds. The reaction product was condensed in a vessel cooled with a mixture of solid carbon dioxide and trichloroethylene. The liquid so obtained was washed first with aqueous 5% sodium hydroxide solution and then with water and was finally dried and fractionated. There was thus obtained 3 - bromo - 3 - chloro - 1:1:2:2-tetrafluoropropane, B.P. 99° C.

The above process was repeated twice under similar conditions except that the silica tube was heated to a temperature of 350° C. and of 410° C. There was likewise obtained the desired product, 3-bromo-3-chloro-1:1: 2:2-tetrafluoropropane, B.P. 99° C.

*Example 3*

A stream of chlorine gas was bubbled at a rate of 7.1 parts by weight per hour through 25 parts by weight of 1:1:2:2-tetrafluoro-3-bromopropane which was kept at reflux temperature by the radiation from a mercury vapour lamp. After one hour, the chlorine supply was disconnected and was replaced by a supply of dry nitrogen. Irradiation was discontinued and after a further 15 minutes the reaction mixture was filtered. The filtrate was fractionated and there was thus obtained 3-bromo-3-chloro-1:1:2:2-tetrafluoropropane, B.P. 99° C.

*Example 4*

A rabbit was tied on the dissection table and a tight face mask fitted with unidirectional respiratory valves was applied. The inguinal region was infiltrated with procaine and the femoral artery was dissected, and canulated for recording the blood pressure.

A mixture of 1.07% of 3-bromo-3-chloro-1:1:2:2-tetrafluoropropane by volume in oxygen was prepared and collected in a Douglas bag. The rabbit inhaled this mixture and continuous records of its blood pressure, respiratory rate, minute volume and ECG were taken during the experiment.

After 4 minutes from the beginning of the inhalation of this mixture the rabbit was fully anaesthetised with loss of corneal reflexes. The concentration of the inhaled vapour mixture was then decreased to 0.5% by volume and this concentration was sufficient to maintain anaesthesia for 1 hour.

At the end of 1 hour of inhalation the blood pressure had fallen from its control value of 114 mm. Hg to 75 mm. Hg, the respiratory rate was slightly decreased from 60/minute to 50/minute with a corresponding decrease of the respiratory minute volume (control 1200 cc./min., during anaesthesia 820 cc./min.).

The heart rate was not affected and no cardiac irregularities were observed during study of the ECG.

*Example 5*

A mongrel dog was lightly anaesthetised with halothane so that it was possible to intubate with an intratracheal tube with an inflating cuff and the femoral artery was dissected and canulated for recording of the blood pressure. ECG records (lead II) were taken. The dog was allowed to recover from the halothane anaesthesia before starting the administration of a mixture containing 3-bromo-3-chloro-1:1:2:2-tetrafluoropropane.

Mixtures of known concentrations of 3-bromo-3-chloro-1:1:2:2-tetrafluoropropane in oxygen were prepared and administered by a method similar to that described in Example 4. Continuous records of blood pressure, respiratory rate, minute volume and ECG were obtained during the experiment. The inhalation of 1.5% by volume of 3-bromo-3-chloro-1:1:2:2-tetrafluoropropane produced surgical anaesthesia within 5 minutes. After 10 minutes of inhalation of this mixture, the concentration of 3-bromo-3-chloro-1:1:2:2-tetrafluoropropane was reduced to 0.7% by volume which was sufficient to maintain anaesthesia for more than 2 hours.

Only slight hypotension and reduction of respiratory minute volume were recorded during the experiment. No cardiac irregularities were observed according to a study of the ECG.

What we claim is:

The new chemical compound 3-bromo-3-chloro-1:1:2: 2-tetrafluoropropane.

References Cited by the Examiner

UNITED STATES PATENTS

| | | | |
|---|---|---|---|
| 2,670,387 | 2/54 | Gottlieb | 260—653 |
| 2,793,155 | 5/57 | Smith | 167—52 |
| 2,838,439 | 6/58 | Goldberg | 167—52 |
| 2,849,502 | 8/58 | Suckling et al. | 260—653 |
| 2,875,253 | 2/59 | Barnhart | 260—653 |
| 3,080,430 | 3/63 | Cohen | 260—653 |

OTHER REFERENCES

Morrison and Boyd: Organic Chemistry, pages 80–84 (1961), Allyn and Bacon, Inc., Boston.

JOSEPH R. LIBERMAN, *Primary Examiner.*

MORRIS O. WOLK, DANIEL E. HORWITZ,
*Examiners.*